United States Patent
Jungert et al.

(10) Patent No.: US 8,186,737 B2
(45) Date of Patent: May 29, 2012

(54) ADJUSTABLE VEHICLE SEAT

(75) Inventors: Dieter Jungert, Weissach (DE); Tassilo Gilbert, Pforzheim (DE); Ulrich Hutschek, Stuttgart (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 164 days.

(21) Appl. No.: 12/551,607

(22) Filed: Sep. 1, 2009

(65) Prior Publication Data

US 2010/0102587 A1   Apr. 29, 2010

(30) Foreign Application Priority Data

Oct. 28, 2008   (DE) .......................... 10 2008 053 475

(51) Int. Cl.
*B60N 2/10* (2006.01)
*B60N 2/22* (2006.01)

(52) U.S. Cl. ............... 296/65.09; 296/65.16; 296/65.17; 296/65.18

(58) Field of Classification Search ............... 296/65.05, 296/65.08, 65.09, 65.16, 65.17, 65.18; 297/31, 297/330, 340, 343, 353, 362.11
See application file for complete search history.

(56) References Cited

U.S. PATENT DOCUMENTS

| | | | | |
|---|---|---|---|---|
| 4,809,180 A | * | 2/1989 | Saitoh | 701/49 |
| 5,971,467 A | * | 10/1999 | Kayumi et al. | 296/66 |
| 7,216,915 B2 | * | 5/2007 | Kammerer et al. | 296/65.09 |
| 7,255,399 B2 | * | 8/2007 | White et al. | 297/378.12 |
| 7,578,537 B2 | * | 8/2009 | Baetz et al. | 296/65.09 |
| 7,850,220 B2 | * | 12/2010 | Holdampf | 296/65.13 |
| 7,891,737 B2 | * | 2/2011 | Mather et al. | 297/334 |
| 2006/0214459 A1 | * | 9/2006 | Kammerer et al. | 296/65.09 |
| 2007/0252403 A1 | * | 11/2007 | Baetz et al. | 296/65.08 |
| 2010/0102586 A1 | * | 4/2010 | Jungert et al. | 296/65.05 |
| 2010/0102587 A1 | * | 4/2010 | Jungert et al. | 296/65.08 |
| 2010/0253110 A1 | * | 10/2010 | Yamada et al. | 296/65.08 |

FOREIGN PATENT DOCUMENTS

| | | |
|---|---|---|
| DE | 28 36 005 | 2/1980 |
| DE | 42 28 849 | 10/1993 |
| DE | 197 54 862 | 6/1998 |
| DE | 199 37 378 | 7/2000 |
| DE | 101 46 144 | 4/2003 |
| EP | 0 445 528 | 9/1991 |
| EP | 0 594 526 | 10/1993 |
| FR | 2829727 | 3/2003 |
| WO | 2006/092205 | 9/2006 |

* cited by examiner

*Primary Examiner* — Glenn Dayoan
*Assistant Examiner* — Gregory Blankenship
(74) *Attorney, Agent, or Firm* — Gerald E. Hespos; Michael J. Porco

(57) ABSTRACT

An adjustable vehicle seat (1) has an inclinable seat part (2) and an inclinable backrest (3) mounted to the seat part (2). Front and rear areas of the seat part (2) are mounted pivotably in bearings (7, 5) at positions adjacent to remote sides of the seat part (2). The bearings (7, 5) also are mounted pivotably in the vehicle floor or rails (11). The lengths of the front bearings (7) can be changed for changing an inclination of the seat part (2). A backrest adjusting motor adjusts inclination of the backrest (3) to compensate for changes in the inclination of the seat part (2).

17 Claims, 1 Drawing Sheet

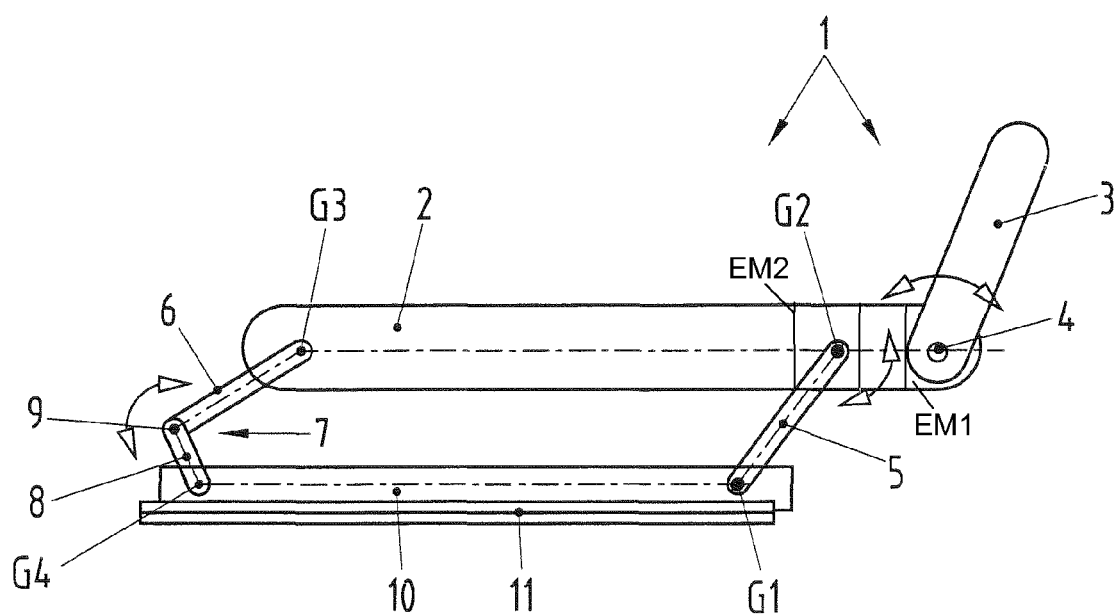

ADJUSTABLE VEHICLE SEAT

CROSS-REFERENCE TO RELATED APPLICATIONS

This application claims priority under 35 USC 119 to German Patent Application No. 10 2008 053 475.7 filed on Oct. 28, 2008, the entire disclosure of which is incorporated herein by reference.

BACKGROUND OF THE INVENTION

1. Field of the Invention

The invention relates to an adjustable vehicle seat.

2. Description of the Related Art

An adjustable vehicle seat, in particular a motor vehicle seat, has an inclinable seat part and an inclinable backrest mounted in the seat part. The seat part is mounted pivotably in bearings at the front and rear adjacent to remote sides of the seat part. The bearings are mounted pivotably in the vehicle floor or rails for longitudinally adjusting the vehicle seat. The front or rear bearings can be adjusted by adjusting means so that the spacing of the pivot axes of the respective bearing and the inclination of the seat part change.

Vehicle seats, such as those of passenger vehicles, have diverse adjustment options. For example, the height, longitudinal position, inclination and/or depth of the seat and the inclination of the backrest can be adjusted.

Vehicle seats with a "parallelogram-type height adjustment" can adjust the inclination and the height of the seat part at the same time by designing the bearings of the height adjustment means as links.

EP 0 445 528 A2 discloses an adjustable vehicle seat of the type mentioned above. The vehicle seat has a seat support with the function of the seat part described above. The seat part is mounted pivotably in the links. A posterior and thigh rest which is mounted pivotably in the seat supports adjacent to the backrest and is intended for the seat user. Toggle levers are mounted pivotably in the seat rails of the vehicle seat at positions in front of the seat supports, with respect to the customary direction of travel. The toggle levers are mounted at their ends facing away from the seat rails in a pivotable manner in the posterior and thigh rest in front of the seat supports. Thus an independent adjustment of the inclination of the posterior and thigh rest with respect to the seat supports is permitted. A backrest is mounted in the rear end of the seat supports in the region of the rear ends thereof. In this case, an articulated fitting for adjusting the angle of the backrest in relation to the seat supports can be provided.

The known vehicle seat disadvantageously has a structurally highly complicated design with the diverse links for adjusting the inclination of the seat supports and of the posterior and thigh rest. Furthermore, an adjustment of the inclination of the seat supports causes a corresponding adjustment of the inclination of the backrest, but no compensation for the adjustment of the backrest to the effect that the backrest has an unchanged inclination with respect to the floor of the vehicle so that the vehicle seat user can substantially retain the leaning inclination of his back when the position of the posterior and thigh rest changes.

Adjustable vehicle seats for motor vehicles also are shown in EP 0 594 526 A1; DE 197 54 962 C1; DE 101 46 144 A1 and DE 42 28 849 C1.

It is the object of the present invention to develop a structurally simple adjustable vehicle seat that has an inclinable seat part and an inclinable backrest configured so that the angle of the backrest compensates for a changed inclination of the seat part.

SUMMARY OF THE INVENTION

The invention relates to a vehicle seat with a seat part that is a seat cushion of the vehicle seat. The seat part has an adjusting means, which upon activation, activates adjusting means for the backrest for adjusting the inclination of the backrest.

In the context of the terminology employed herein, the term "seat cushion" of the vehicle seat is understood as meaning the entire seat unit that is mounted in the vehicle floor or in the rails for the longitudinal adjustment of the seat. The seat cushion supports the backrest. The adjustment of the seat cushion by means of the bearings leads directly to an adjustment of the posterior and thigh rest, which forms part of the seat cushion, for the person sitting on the vehicle seat. The seat cushion has a seat support or a plurality of seat supports connected to the links. Furthermore a cushion shell is held by the seat support or the seat supports and the posterior and thigh rest is held by the cushion shell. The mounting of the seat cushion in the bearings enables the seat cushion to be adjusted entirely within the context of an inclination upon activation of the adjusting means for the bearings. The bearings function exclusively to adjust the inclination of the seat cushion and hence the posterior and thigh rest.

The vehicle seat of the subject invention does not require separate bearing elements for pivoting the posterior and thigh rest, which is mounted in the seat supports, and hence the subject invention contrasts to the adjustable driver's seat of EP 0 445 528 A2. Rather all of the bearing elements of the adjustable vehicle seat of the invention act exclusively on the seat cushion. The vehicle seat of the invention realizes the same adjustment option as in the seat of EP 0 445 528 A2, while saving on separate bearing elements for adjusting the posterior and thigh rest and with simplified kinematics.

The seat support, the cushion shell and the posterior and thigh rest preferably constitute a single unit. Thus, the diversity of parts in the vehicle seat can be reduced substantially.

The inclination of the seat cushion is changed by activating the adjusting means for the seat cushion. The change in the position of inclination of the seat cushion is detected by the adjusting means for the backrest isochronously and perfectly while also with a time delay, and preferably a brief time delay. The adjusting means for the backrest then is activated to adjust the inclination of the backrest to compensate for the change in inclination of the seat cushion. The inclination of the backrest following this compensating adjustment is again in a substantially unchanged position of inclination with respect to the floor of the vehicle as compared to the inclination of the backrest that had existed before the adjustment of the inclination of the seat cushion. The inclination of the seat cushion relative to the floor therefore is changed, but the inclination of the backrest relative to the floor is not.

The adjusting means for adjusting the inclination of the seat cushion and/or the adjusting means for adjusting the inclination of the backrest preferably are electric adjusting means. More particularly, the electrical adjusting means for compensating for the changed inclination of the backrest can be activated in a simple manner upon activation of the electrical adjusting means for changing the inclination of the seat cushion.

The adjustable vehicle seat is made structurally simple by having the front or rear bearings, and preferably the rear bearings, designed as links that cannot be changed in length.

The height and inclination of the seat cushion is adjusted during pivoting of said links about their lower mounting on the floor or rail and about their upper mounting on the seat cushion. A mounting of the seat cushion then should be provided in the region of the other end of the seat cushion so that the spacing of the mounting of the seat cushion in the floor or the longitudinal rails can be changed. For example, the front or rear bearings, and preferably the front bearings, are designed as toggle levers. Each toggle lever has two rockers connected pivotably to each other. The one rocker is mounted pivotably in the seat cushion and the other rocker is mounted pivotably in the vehicle floor or the rail.

An alternative to the above-described construction is distinguished by a lever construction in which a rocker is pivoted by means of the associated adjusting means. More particularly, the front or rear bearings, and preferably the front bearings, are links that can be changed in length. A toggle lever arrangement therefore is not used in this case. The changeability of the lengths of the links can be brought about, for example, by means of electromotive adjusting means, in particular an electric spindle drive.

Further advantages and features of the invention emerge from the description below of an exemplary embodiment of the invention without being restricted thereto.

BRIEF DESCRIPTION OF THE DRAWINGS

FIG. 1 shows a schematic illustration of the adjustable vehicle seat according to the invention, as seen from the side.

DETAILED DESCRIPTION OF THE PREFERRED EMBODIMENT

An adjustable vehicle seat in accordance with the invention is identified by the numeral 1 in FIG. 1. The adjustable vehicle seat 1 has a substantially horizontally arranged seat cushion 2 and backrest 3, which is reduced in size in FIG. 1 and therefore is not illustrated to scale. The seat cushion 2 is formed by a seat support, a cushion shell mounted therein and a posterior and thigh rest held by the cushion shell. These elements are not shown specifically in FIG. 1. The backrest 3 is at a rear region of the seat cushion 2 and can be pivoted about an axis 4 arranged transversely with respect to the longitudinal extent of the vehicle. All of the pivot axes, as explained below, run parallel to the axis 4.

The backrest 3 can be pivoted about the axis 4 by an electric actuating drive, and specifically an electric motor EM1, for adjusting the inclination of the backrest 3. For this propose, the electromotive actuating drive can be arranged, for example, adjacent to the axis 4 in the seat cushion 2 and can convert the movement of the electric motor EM1 into the adjusting movement of the backrest 3 via suitable transmission means, for example a pinion and a gearwheel.

A link 5 is mounted on each of the left and right sides of the seat cushion 2 near the back of the seat cushion 2, but in front of the axis 4. The link 5 can pivot about the axis G2. A rocker 6 of a toggle lever 7 is mounted in the seat cushion 2 at the front. The relatively long rocker 6 is connected pivotably in the region of the axis 9 to a relatively short rocker 8 of the toggle lever 7. The rocker 8 is mounted pivotably in the region of its lower end about the axis G4 in a longitudinal rail 11 mounted in the floor 10 of the motor vehicle. Correspondingly, the lower end of the link 5 is mounted in the longitudinal rail 11 in a manner to pivot about the axis G1. The link 5 is arranged at a steeper angle than the rocker 6, with both parts being directed obliquely forwards from their respective axes G2 and G3.

The links 5 in the rear region of the seat cushion 2 are driven by adjusting means, for example by an electric motor EM2, mounted in the seat cushion 2 for driving the axis/shaft G2 and thereby adjusting the height and/or inclination of the seat cushion 2, which is connected fixedly to the links 5. More particularly the inclination of the seat cushion 2 changes due to the connection of the seat cushion 2 via the links 5 and the toggle lever 7. Therefore, the inclination of the backrest 3, which is mounted in the seat cushion 2, also changes. However, upon activation of the adjusting means EM2 for the links 5, the adjusting means EM1 for the backrest 3 is activated isochronously or with somewhat of a time delay to the effect that the backrest 3 substantially retains its angular position with respect to the longitudinal extent of the longitudinal rails 11. The adjusting means for the backrest 3 may be the electric motor for adjusting the seat cushion 2, and therefore the electric motor can serve to adjust both the seat cushion 2 and backrest 3 with appropriate arrangements of gears.

What is claimed is:

1. An adjustable vehicle seat with an inclinable seat part and an inclinable backrest mounted to the seat part, front and rear areas of the seat part being mounted pivotably in bearings at positions adjacent to remote sides of the seat part, each of the bearings being mounted pivotably in the vehicle floor or rails, seat adjustment means for adjusting the front bearings or the rear bearings for changing a spacing between pivot axes of the respective bearing and thereby changing an inclination of the seat part, and backrest adjusting means for detecting the changing of the inclination of the seat part and adjusting inclination of the backrest relative to the vehicle floor to maintain a substantially constant angle of inclination of the backrest relative to the vehicle floor before and after the changing of the inclination of the seat part, so that the adjusting of the inclination of the backrest substantially compensates for the adjusting of the seat part.

2. The vehicle seat of claim 1, wherein the seat adjusting means and the backrest adjusting means are electric adjusting means.

3. The vehicle seat of claim 2, wherein the seat adjusting means and the backrest adjusting means act isochronously or with a time delay.

4. The vehicle seat of claim 1, wherein the rear bearings are links that cannot be changed in length.

5. The vehicle seat of claim 4, wherein the front are bearings toggle levers, each of the toggle levers having first and second rockers connected pivotably to each other, the first rocker being mounted pivotably in the seat part and the second rocker being mounted pivotably in the vehicle floor or the rail.

6. The vehicle seat of claim 4, wherein the front bearings are links that can be changed in length.

7. The vehicle seat of claim 6, further comprising an electromotive adjusting means for changing the length of the front bearings.

8. The vehicle seat of claim 1, wherein the seat part has a seat support, a cushion shell held by the seat support and a posterior and thigh rest held by the cushion shell.

9. The vehicle seat of claim 8, wherein the seat support, the cushion shell and the posterior and thigh rest constitute a single unit.

10. An adjustable vehicle seat comprising:
an inclinable seat part having front and rear ends;
front and rear links each having an upper end pivotably connected respectively to the front and rear ends of the seat part and lower ends pivotably mounted in a floor or rails, the front links being adjustable for changing a spacing of pivot axes of the front links and for changing an inclination of the seat part the floor;

an inclinable backrest mounted pivotably to the rear end of the seat part;

a seat adjusting means for adjusting the front links and changing the inclination of the seat part relative to the floor; and a backrest adjusting means for detecting the changing of the inclination of the seat part and inclining the backrest sufficiently relative to the vehicle floor to compensate for the changed inclination of the seat part.

11. The vehicle seat of claim 10, wherein the seat adjusting means and the backrest adjusting means are electric adjusting means.

12. The vehicle seat of claim 11, wherein the seat adjusting means and the backrest adjusting means act isochronously.

13. The vehicle seat of claim 11, wherein the seat adjusting means and the backrest adjusting means act with a time delay.

14. The vehicle seat of claim 11, wherein the seat adjusting means comprises an electromotive adjusting means for adjusting the front links.

15. A method for adjusting a vehicle seat relative to a floor of a motor vehicle, the vehicle seat having a seat cushion inclinably mounted on the floor and a backrest pivotably mounted to the seat cushion, the method comprising:

adjusting an inclination of the seat cushion relative to the floor based on user input;

detecting the changing of the inclination of the seat cushion; and automatically pivoting the backrest relative to the seat cushion so that an angle of inclination of the backrest relative to the floor remains substantially unchanged after the step of adjusting the inclination of the seat cushion.

16. The method of claim 15, wherein the step of adjusting the inclination of the seat cushion and the step of automatically pivoting the backrest relative to the seat cushion occur substantially isochronously.

17. The method of claim 15, wherein the step of automatically pivoting the backrest relative to the seat cushion occurs with a time delay after the step of adjusting the inclination of the seat cushion.

* * * * *